(12) United States Patent
Jung

(10) Patent No.: US 9,266,460 B2
(45) Date of Patent: Feb. 23, 2016

(54) VEHICLE FOR PERFORMANCES

(71) Applicant: Kil Jung, Seoul (KR)

(72) Inventor: Kil Jung, Seoul (KR)

( * ) Notice: Subject to any disclaimer, the term of this patent is extended or adjusted under 35 U.S.C. 154(b) by 0 days.

(21) Appl. No.: 14/398,129

(22) PCT Filed: Mar. 20, 2014

(86) PCT No.: PCT/KR2014/002326
§ 371 (c)(1),
(2) Date: Nov. 12, 2014

(87) PCT Pub. No.: WO2015/034152
PCT Pub. Date: Mar. 12, 2015

(65) Prior Publication Data
US 2015/0107164 A1    Apr. 23, 2015

(30) Foreign Application Priority Data

Sep. 4, 2013    (KR) .......................... 10-2013-0105990

(51) Int. Cl.
*E04H 3/28*    (2006.01)
*B60P 3/025*    (2006.01)

(52) U.S. Cl.
CPC ................ *B60P 3/0252* (2013.01); *E04H 3/28* (2013.01)

(58) Field of Classification Search
CPC ................................ B60P 3/0252; E04H 3/28
USPC ............................................... 52/6, 7; 472/75
See application file for complete search history.

(56) References Cited

U.S. PATENT DOCUMENTS

| | | | | | |
|---|---|---|---|---|---|
| 2,846,221 | A | * | 8/1958 | Skinner | A63J 1/00 472/75 |
| 3,181,203 | A | * | 5/1965 | Wenger | E04B 1/34336 248/354.6 |
| 3,258,884 | A | * | 7/1966 | Wenger | E04H 3/22 52/182 |
| 3,417,518 | A | * | 12/1968 | Jaffe | E04B 1/3444 296/173 |
| 3,620,564 | A | * | 11/1971 | Wenger | E04H 3/28 160/19 |
| 4,026,076 | A | * | 5/1977 | Analetto | E04H 3/28 296/26.14 |
| 4,232,488 | A | * | 11/1980 | Hanley | E04H 3/28 108/166 |
| 4,512,117 | A | * | 4/1985 | Lange | E04H 3/10 403/331 |
| 4,720,945 | A | * | 1/1988 | Berranger | B60P 3/0252 52/143 |
| 5,716,090 | A | * | 2/1998 | Chang | B60P 3/0252 296/26.01 |
| 6,393,769 | B1 | * | 5/2002 | Mertik | E04H 3/28 296/162 |
| 8,042,854 | B2 | * | 10/2011 | Braswell | B60P 3/0252 296/26.15 |

(Continued)

FOREIGN PATENT DOCUMENTS

| KR | 20-0171391 Y1 | 3/2000 |
|---|---|---|
| KR | 10-2011-0088724 A | 8/2011 |

*Primary Examiner* — James Ference
*Assistant Examiner* — Charissa Ahmad
(74) *Attorney, Agent, or Firm* — Patent Office of Dr. Chung Park

(57) ABSTRACT

A vehicle for performances comprises a roof, a floor, and a roof lifting member that is disposed in an orthogonal direction between the floor and the roof. Also, roof extension panels are pivotably coupled to both sides of the upper end of the roof, and floor extension panels are pivotably disposed at both sides of the floor. In this case, the roof extension panels are spread, and then the roof is lifted up. Thereafter, the floor extension panels are spread, and then folding-type auxiliary panels are spread to both sides and fixed by supports. Next, flying speaker supporting trusses are pivoted to the outside by a certain angle to install flying speakers. Next, the visual equipment supporting trusses are spread to both sides, and then visual equipment is spread. Thereafter, an installation into a performance state is completed by shortening the length of a fixing cable.

4 Claims, 11 Drawing Sheets

(56) References Cited

U.S. PATENT DOCUMENTS

| | | | | |
|---|---|---|---|---|
| D672,054 S * | 12/2012 | Mertik | | D25/18 |
| 8,678,941 B2 * | 3/2014 | Bilsen | | B60P 3/0252 |
| | | | | 446/427 |
| 8,770,422 B2 * | 7/2014 | Cantin | | E04B 1/3442 |
| | | | | 206/386 |
| 8,978,311 B1 * | 3/2015 | Uhl | | B60P 3/0252 |
| | | | | 52/36.1 |
| 2002/0149927 A1 * | 10/2002 | Westhofen | | F21L 14/04 |
| | | | | 362/147 |
| 2004/0123529 A1 * | 7/2004 | Wiese | | E04H 3/28 |
| | | | | 52/6 |
| 2005/0083690 A1 * | 4/2005 | Griffin | | F21S 2/00 |
| | | | | 362/249.08 |
| 2006/0132909 A1 * | 6/2006 | Wheeler | | G03B 29/00 |
| | | | | 359/443 |
| 2008/0030853 A1 * | 2/2008 | Creel | | G03B 21/58 |
| | | | | 359/461 |
| 2009/0173033 A1 * | 7/2009 | Baxter, Jr. | | A63J 1/00 |
| | | | | 52/646 |
| 2012/0096775 A1 * | 4/2012 | Allison | | B60P 3/0252 |
| | | | | 52/7 |
| 2012/0272584 A1 * | 11/2012 | Bilsen | | E04H 3/28 |
| | | | | 52/7 |
| 2012/0272585 A1 * | 11/2012 | Bilsen | | E04H 3/28 |
| | | | | 52/7 |
| 2012/0277010 A1 * | 11/2012 | Bilsen | | B60P 3/0252 |
| | | | | 472/75 |
| 2013/0333302 A1 * | 12/2013 | Valente | | E04H 3/123 |
| | | | | 52/7 |

* cited by examiner (a)

(b)

VEHICLE FOR PERFORMANCES

CROSS-REFERENCE TO PRIOR APPLICATIONS

This application is a national Stage Patent Application of PCT International Patent Application No. PCT/KR2014/002326, filed on Mar. 20, 2014 under 35 U.S.C. §371, which claims priority of Korean Patent Application No. 10-2013-0105990, filed on Sep. 4, 2013, which are all hereby incorporated by reference in their entirety.

TECHNICAL FIELD

The following disclosure relates to a vehicle for performances, and in particular, to a vehicle for performances, which can allow a stage and a stage setting to be easily installed upon outdoor performances using structures installed in a carrying box of a freight vehicle.

BACKGROUND ART

Generally, performances such as musical performances or play performances are performed in an indoor stage or a theater which is equipped with sound equipment and lighting system.

However, performances are often performed in the open air.

For such outdoor performances, the performance stage may be prepared in the following order. First, a stage installation company installs a floor, and then a truss for a roof is installed for the sound and lighting equipment.

Thereafter, sound and lighting companies place various kinds of sound and light equipment on the floor and roof (truss) of the stage that is installed, and then connect power lines and signal lines to each equipment to complete the installation of the stage and performance equipment.

This installation process usually takes several hours. Also, since a stage manufacturing company, a truss (stage roof) installation company, a sound installation company, and a lighting installation company should perform each site work, a lot of cost is needed.

In order to overcome such limitations of time and cost, vehicle structures which can be utilized as a stage using a special structure of a freight vehicle are being developed.

Korean Utility Model No. 20-0171391 discloses a "vehicle with equipments for outdoor performance", which is installed by opening extension panels of an L-shape that connect the roof and the side wall.

However, Korean Utility Model No. 20-0171391 has a limitation in that the height of the ceiling cannot satisfy about 5 meters to about 6 meters necessary for the performance in terms of structure.

The present applicant has filed Korean Patent Application Publication No. 10-2011-88724 entitled "vehicle for outdoor performance", which can simply achieve a performance stage by spreading extension panels and lifting the roof (roof of stage), and enables the ceiling height of about 5 meters to about 6 meters.

However, in these related arts, when a stage is prepared by opening/closing the wing, lighting and sound devices need to be individually installed. Accordingly, time and cost for installation of the stage are not easy to save.

Moreover, it is not easy to secure a space or a place for installation of flying speakers that need to be installed at a sufficient height without a structural obstacle In addition, there is a limitation in that the extension panels forming the stage roof when spread may be bent or distorted by the weight thereof.

DISCLOSURE

Technical Problem

Accordingly, the present disclosure provides a vehicle for performances, which can save the time and cost spent for the stage installation through an automatic installation of the lighting and sound equipment.

The present disclosure also provides a vehicle for performances, which can allow the sound, lighting, and visual equipments to be simply installed only by spreading extension panel parts for the preparation of a stage and then spreading a truss.

The present disclosure also provides a vehicle for performances, which overcomes a distortion of a roof extension panel by the weight of sound equipment (speaker) and lighting and a danger occurring due to shaking by a movement of a performer or wind.

The present disclosure also provides a vehicle for performances, the stage installation direction of which can be simply changed.

Technical Solution

In one general aspect, a vehicle for performances includes: a roof forming an upper surface of a freight vehicle carrying box; a floor forming a bottom surface of the freight vehicle carrying box; a roof lifting member vertically disposed at both sides of front and rear sides of a floor and lifting up and down the roof; a floor extension panel pivotably coupled to both sides of the floor; and a roof extension panel pivotably coupled to both sides of the roof, folded toward the outside of the floor extension panel when the floor extension panel is folded, and covering one side surface of the freight vehicle carrying box when the roof extension panel is folded, wherein the vehicle is transformed into a performance type by spreading the roof extension panel, spreading the floor extension panel, and then lifting up the roof by the roof lifting member, and the vehicle is transformed into a movable type by folding the floor extension panel, folding the roof extension panel, and then lifting down the roof.

Other features and aspects will be apparent from the following detailed description, the drawings, and the claims.

Advantageous Effects

According to embodiments of the present invention, lighting and sound equipment can be simply installed by opening/closing a roof extension panel and a flow extension panel, raising a roof, spreading a truss to adjust the direction of lighting, and moving a speaker to a certain location.

Thus, a typical stage installation that takes about 4 to 5 hours can be completed within about 10 minutes, significantly shortening the installation time of an outdoor stage and thus enabling an instant concert.

Moreover, instead of a large amount of cost occurring due to each site work by a stage manufacturing company, a truss (roof) installation company, a sound installation company, and a lighting installation company, since the installation of the stage and performance device can be completed only with a single vehicle for performances, cost necessary for the installation of the outdoor stage and performance device can be significantly saved.

In addition, it is possible to overcome typical limitations such as bending or distortion of the roof extension panel by the weight of the sound devices (speakers) and lighting devices, a danger occurring due to shaking by the movement of a performer and wind, and an installation limitation of a flying speaker.

BEST MODE

Figure 1:
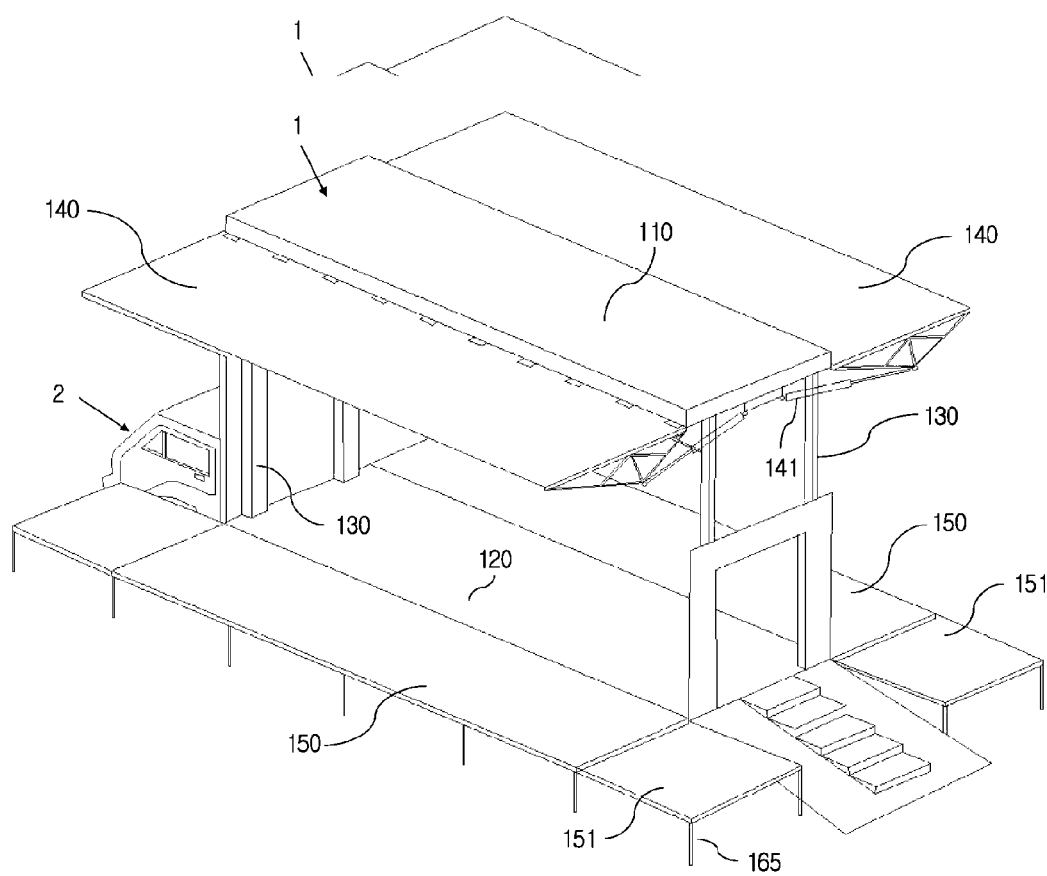
FIG. 1 is a view illustrating a floor extension panel and a roof extension panel spread into a performance type of a vehicle for performances according to an embodiment of the present invention.

Hereinafter, the present invention will be described in detail by explaining preferred embodiments of the invention with reference to the attached drawings. Meanwhile, in order to clarify the present invention, contents unrelated to the constitution of the present invention will be ruled out. Like reference numerals in the drawings denote like elements.

Furthermore, when it is described in detailed description of the invention or claims that one comprises (or includes or has) some elements, it should be understood that it may comprise (or include or has) only those elements, or it may comprise (or include or have) other elements as well as those elements if there is no specific limitation.

FIG. 1 is a view illustrating a vehicle for performances transformed into a performance type when a floor extension panel and a roof extension panel are spread and a floor is lifted upon installation of the vehicle for performances into the performance type according to an embodiment of the present invention.

As shown in FIG. 1, a freight vehicle carrying box 1 may be connected to a vehicle 2.

The vehicle 2 may be a means for transporting the freight vehicle carrying box 1.

The vehicle for performances according to the embodiment of the present invention may include a wing body carrying box 1 or may be implemented into a combination form of the wing body carrying box 1 and the vehicle 2.

Meanwhile, the wing body carrying box 1 may include a structure as shown in FIG. 1.

A roof 110 may correspond to a top surface of the wing body carrying box 1.

A floor 120 may correspond to a bottom surface of the wing body carrying box 1.

A roof lifting member 130 may be orthogonally disposed at the both sides of the front and rear sides of the floor 120.

The roof lifting member 130 may be extended in length by a hydraulic cylinder therein, and thus may allow the roof 110 to rise in an upward direction.

As shown in FIG. 1, an auxiliary support of the roof lifting member 130 may have a shape longitudinally extending in a vertical direction, and may vary in length by an internally overlapping structure of two pipes having different sizes.

Meanwhile, the roof lifting member 130 may support the undersurface of the roof 110.

Also, the roof lifting member 130 may allow the roof 110 to return to start position by being restored to the original length.

Roof extension panels 140 may be pivotably coupled to both side of the roof 110.

The roof extension panels 140 may be pivoted by a roof extension panel opening/closing cylinder 141 operated by a hydraulic pressure.

The roof extension panel opening/closing cylinder 141 may be connected between one side of the side wall of the roof 110 and one side of the undersurface of the roof extension panel 140.

The roof extension panel 140 may be spread so as to become parallel to the roof 110, and may be supported by the roof extension panel opening/closing cylinder 141.

The floor extension panel 150 may be pivotably coupled to both side of the floor 120.

The floor extension panel 150 may be pivoted by a floor extension panel opening/closing member 152 that is a cylinder operated by a hydraulic pressure.

The floor extension panel 150 may be spread so as to become parallel to the floor 120, and may be supported by the floor extension panel opening/closing member 152.

Hereinafter, a process of installing a stage will be described with reference to FIG. 1. First, the vehicle 2 may be moved to a performance place.

The wing body carrying box 1 may be transformed into the performance type to install a stage for performance. When the installation of the stage is completed, the wing body carrying box 1 may be moved to a location at which the stage is to be installed, and then the vehicle 2 may be separated and moved to a separate place.

In order to transform the wing body carrying box 1 into the performance type, as show in FIG. 1, the front roof extension panel 140 may be spread until becoming parallel to the roof 110, and then the floor extension panel 150 may be spread.

In this case, a support may be extended and fixed to the ground under the floor extension panel 150.

Meanwhile, a pair of folding-type floor auxiliary panels 151 that is pivotably coupled to the end of the floor extension panel 150 may be provided at both sides of the floor extension panel 150.

As shown in FIG. 1, the floor extension pane 150 may be spread and fixed with supports 165, and then the pair of folding-type floor auxiliary panels 151 may be spread to both sides.

Then, the roof lifting member 130 may be controlled to raise the roof 110.

The roof 110 may be sufficiently raised to a height that can secure the ceiling height of about 5 meters to about 6 meters.

The floor may be prepared through this process.

Thereafter, as described later, the lighting and visual equipment, and the sound equipment including the flying speakers and the woofer speakers may be installed to complete the installation of the stage and performance equipment.

Meanwhile, after the performance is finished, the wing body carrying box 1 may be transformed into the movable type by the reverse order of the above process.

That is, the sound and light equipment installed on the roof, and the visual equipment may be folded into the movable type.

Thereafter, the roof 110 may be lowered to the original location using by the roof lifting member 130.

Next, the pair of folding-type floor auxiliary panels 151 may be folded to and stored in the inside of the floor extension panel 150, and the floor extension panels 150 at the both sides may be folded and fixed, respectively.

Then, the roof extension panels 140 at the both sides may be folded. The roof extension panel 140 may be folded to the outside of the floor extension panel 150 when the floor extension panel 150 is folded.

Thereafter, the vehicle 2 may be connected to the wing body carrying box 1 so as to be movable.

Hereinafter, an installation process of the lighting equipment, the visual equipment, and the sound equipment after the stage is installed will be described with reference to FIGS. 2 through 7.

Figure 2A:
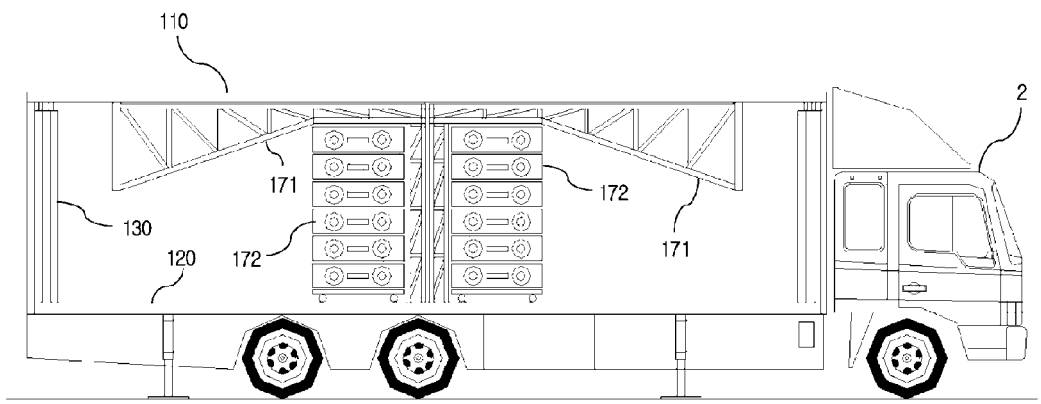
FIGS. 2A to 2C are side views illustrating a vehicle for performances, spread from a movable type to a performance type according to an embodiment of the present invention.
Figure 2B:
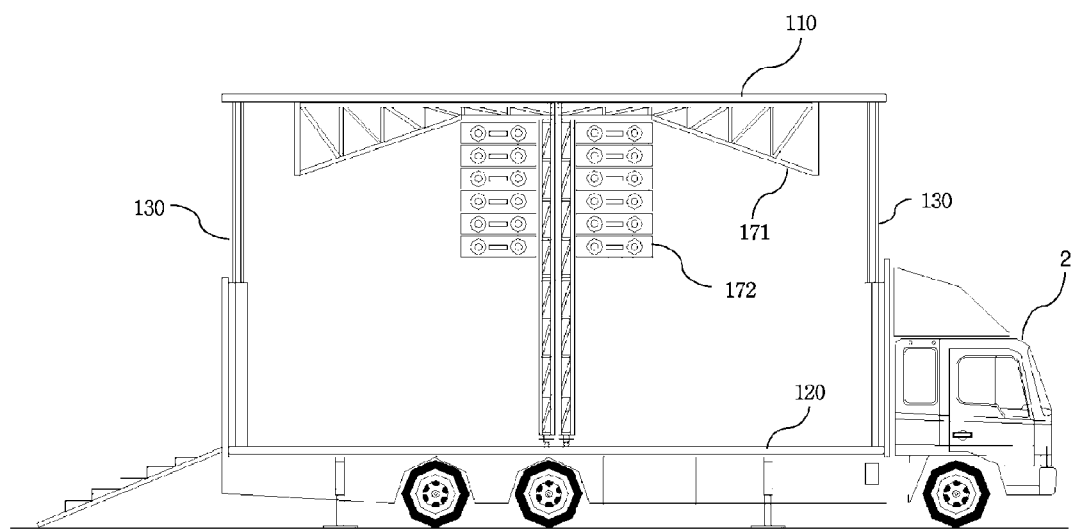
Figure 2C:
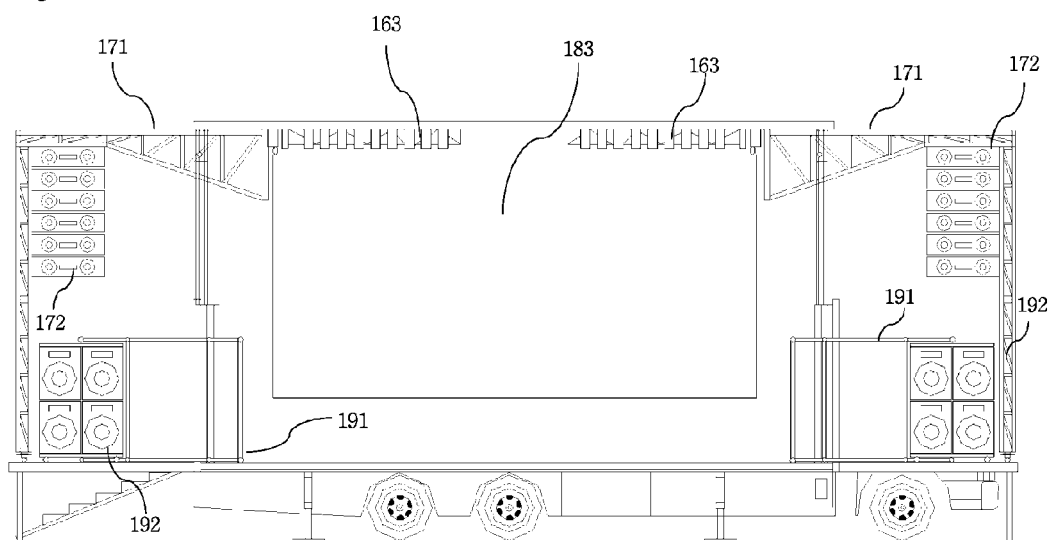
Figure 3A:
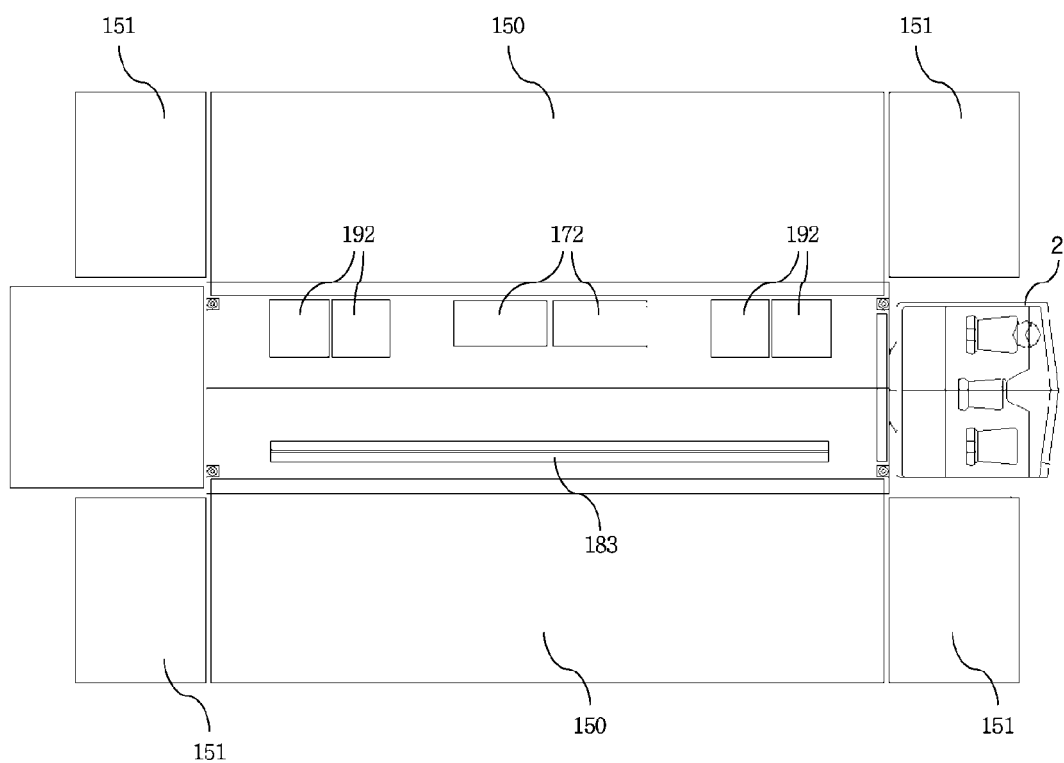
FIGS. 3A to 3C are plan views illustrating a transformation process of a vehicle for performance into a performance type according to an embodiment of the present invention.
Figure 3B:
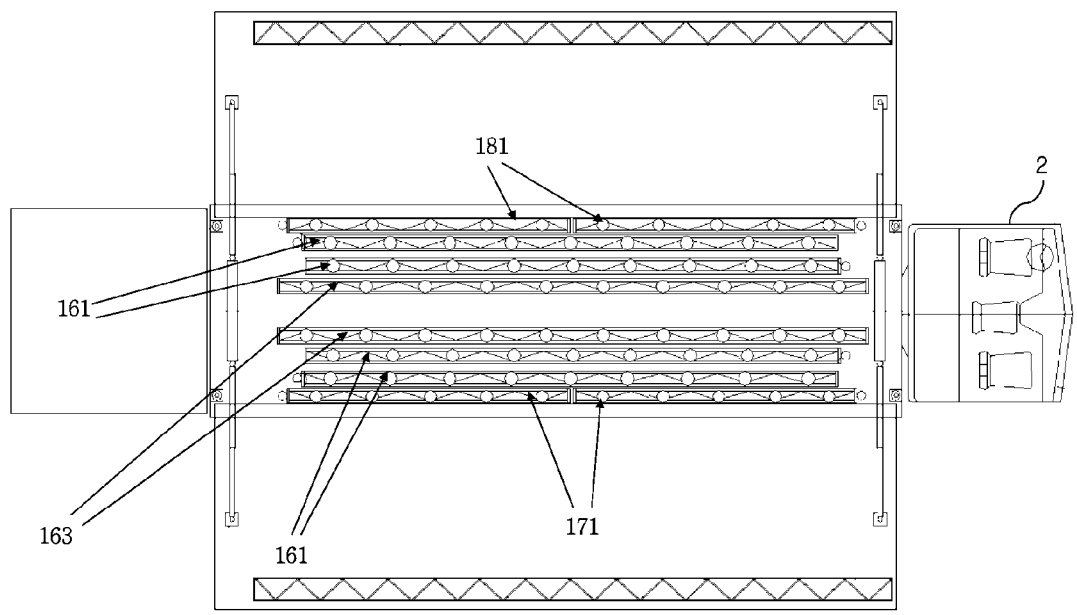
Figure 3C:
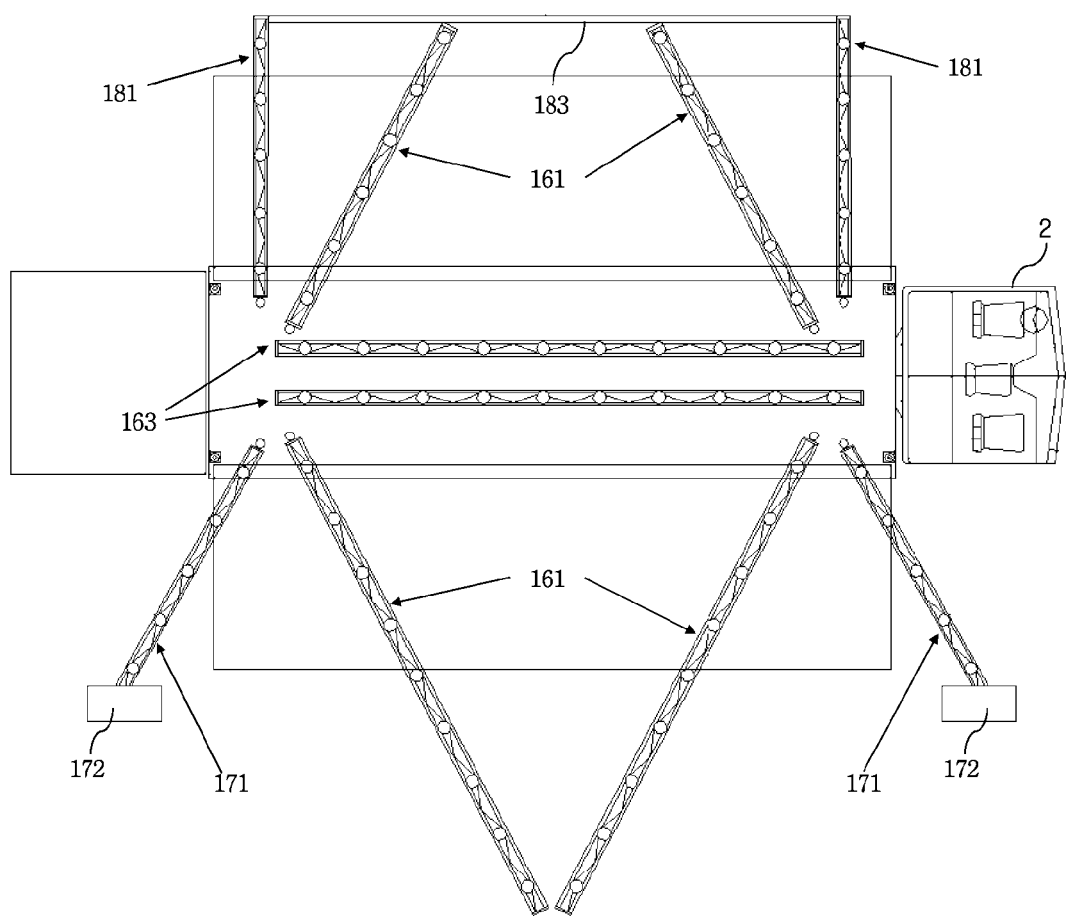

FIGS. 2A to 2C are side views illustrating a vehicle for performances, spread from a movable type to a performance type according to an embodiment of the present invention. FIGS. 3A to 3C are plan views illustrating a transformation process of a vehicle for performances into a performance type according to an embodiment of the present invention.

FIG. 2A shows a state in which only the roof extension 140 and the floor extension panel 150 are spread, with a flying speaker supporting truss 171 and a flying speaker 172 therein exposed to the outside.

FIG. 2B shows a state in which the roof 110 is lifted up to secure a certain ceiling height, and FIG. 2C shows a state in which all of the flying speaker 172, the folding-type visual equipment 183, the woofer speaker 192 and the lighting are completely installed. That is, FIG. 2C shows a state in which all of lighting, sound and visual equipments are prepared.

FIGS. 3A and 3B show a state in which various kinds of member are loaded in the freight vehicle carrying box 1 when the freight vehicle is in the movable state. FIG. 3C shows a state in which the installation of the light, sound and visual equipments is completed while the roof extension panel 140 and the floor extension panel 150 are spread FIGS. 3A and 3B may correspond to FIG. 2A, and FIG. 3C may correspond to FIG. 2C.

FIG. 3A presentively shows a state in which the woofer speaker 192, the flying speaker 172 and the folding-type visual equipment 183 are loaded on the floor 120.

Actually, the flying speaker 172 may be fixed to the flying speaker supporting truss 171, and the folding-type visual equipment 183 may be loaded while a visual equipment fixing cable 182 connected to the visual equipment supporting truss 181 is sufficiently unwound. Also, the woofer speaker 192 may be connected to one side of a folding-type pivoting guide 191, and may be loaded while the folding-type pivoting guide 191 is folded.

As shown in FIG. 3A, the floor auxiliary panels 151 may be spread at both sides of the floor extension panels 150.

The stage space may be secured by the floor 120 and a pair of floor extension panels 150 disposed at both sides of the floor 120.

Meanwhile, the woofer speaker 192 among the sound equipment needs to be disposed toward the front of the stage, and may inevitably occupy a portion of the stage space. Accordingly, in order to prevent the stage space from excessively narrowing, the floor auxiliary panels 151 may be further provided at left and right sides of the floor extension panel 150.

Nevertheless, the width and the length of the floor auxiliary panels 151 may be limited by the size of the floor extension panel 150. Accordingly, in order to secure a broader space, the floor auxiliary panels 151 may be provided so as to overlap the floor extension panel 150 by a hinge structure, and then may be spread when the stage is installed.

Figure 4:
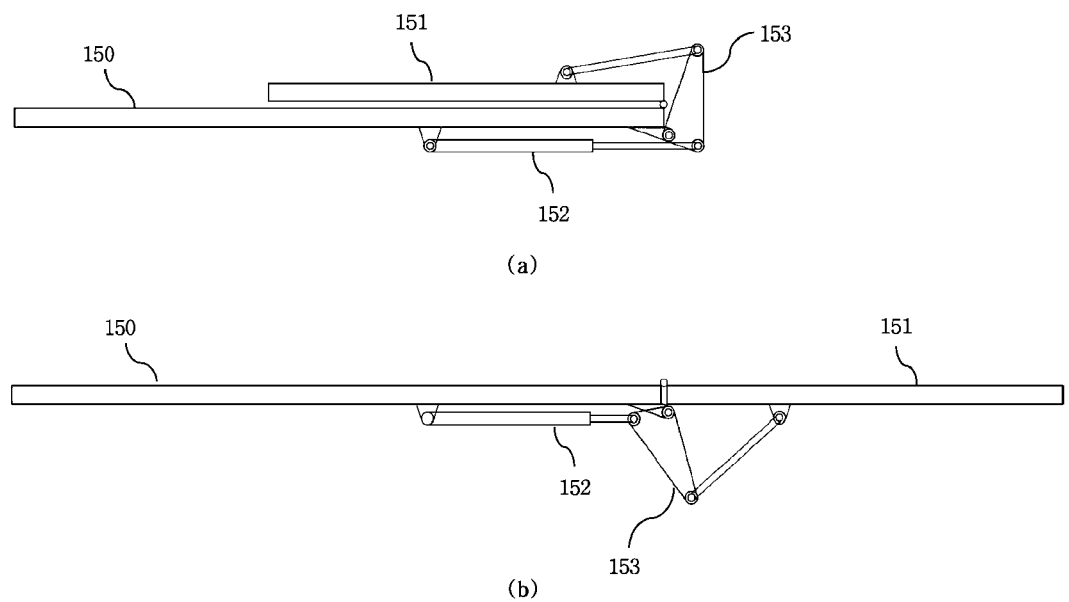
FIG. 4 is a view illustrating an opening/closing manner of a floor auxiliary panel.

FIG. 4 shows a structure of the floor auxiliary panel 151.

As shown in FIG. 4, the floor auxiliary panel 151 may be further provided at one end of the floor extension panel.

Meanwhile, for the automation of the stage installation, the floor auxiliary panel 151 may be pivoted from the floor extension panel by a hydraulic cylinder.

To this end, a floor auxiliary panel opening/closing member 152 may be a hydraulic cylinder, and may be fixedly disposed on the undersurface of the floor extension panel 150. Also, the end of the cylinder may be connected to a floor auxiliary panel supporting member 153.

The floor auxiliary panel supporting member 153 may be pivotably coupled to one end of the floor extension panel 150 by a hinge structure, and may extend to the undersurface of the floor auxiliary panel 151.

Accordingly, as shown in FIGS. 4A and 4B, the floor auxiliary panel 151 may be opened/closed by the operation of the floor auxiliary panel opening/closing member 152.

FIG. 3B shows a state in which a plurality of trusses are folded and loaded under the roof 110.

As shown in FIG. 3B, a plurality of truss structures may be disposed under the roof 110 along the longitudinal direction of the roof 110.

Such truss structures may include a pair of left and right visual equipment supporting trusses 181, two movable lighting trusses 161, two fixed lighting trusses 162, and a pair of left and right flying speaker supporting trusses 171 sequentially from the top of FIG. 3B.

These truss structures, which are structures of a truss type, may also serve as a reinforcing member for preventing a frame of the freight vehicle carrying box 1 from being distorted or bent by the weight of the lighting, the flying speaker, or the visual equipment.

The fixed lighting truss 163 at the center may be fixed to the undersurface of the roof 110, and may be a structure of a truss type, serving as a reinforcing member for preventing the frame of the wing body carrying box 1 from being distorted or bent by the weight of the lighting, the flying speaker, or the display.

One or two fixed lighting trusses 163 may be disposed, and each fixed lighting truss 163 may be equipped with lighting beforehand. Wirings connected to each lighting may be mounted in the fixed lighting truss 163.

In FIG. 3, one or more movable lighting trusses 161 may be further disposed under and over the fixed lighting trusses 163, and may be pivotably disposed at both sides on the undersurface of the roof 110 by a hinge.

Lighting apparatuses may be beforehand disposed on the movable lighting truss 161 at a uniform interval, and wirings to the lighting apparatuses may be mounted in the movable lighting truss 161.

A pair of flying speaker supporting trusses 171 may be disposed at the lowermost portion of FIG. 3, which includes a hinge structure pivoted about the rotation axis disposed at both left and right sides of the undersurface of the roof 110.

As shown in FIG. 2C, reinforcing trusses doubly overlapping by a pivoting hinge may be disposed at both ends of the pair of the flying speaker supporting trusses 161, and may be vertically spread according to the rising of the roof, preventing the main frame of the stage roof from being distorted or bent by strong wind and the weight of the flying speaker, the display, and the lighting equipment.

A set of flying speakers 172 may be disposed at both ends of the flying speaker supporting truss 171.

The flying speaker may require an installation height, and needs to be installed at a location where no obstacle exists between the flying speaker and audience.

According to the lifting of the roof 110, the height of the flying speaker supporting truss 161 disposed on the undersurface of the roof 110 may also be sufficiently raised. Also, as the flying speaker supporting trusses 161 are spread to both sides, respectively, the flying speakers 172 may be simply installed at a high location where no obstacle exists.

As shown in FIG. 1, the roof extension panel 140 and the floor extension panel 150 may be spread, and then the pair of flying speaker supporting trusses 161 may be spread toward the outside, preferably, spread by a pivoting of about 150 degree. Thus, as shown in FIG. 2C, the flying speakers can be installed into the performance state Meanwhile, a flying speaker folding-type vertical support 173 may be further disposed to support the weight the flying speakers 172.

Figure 5:
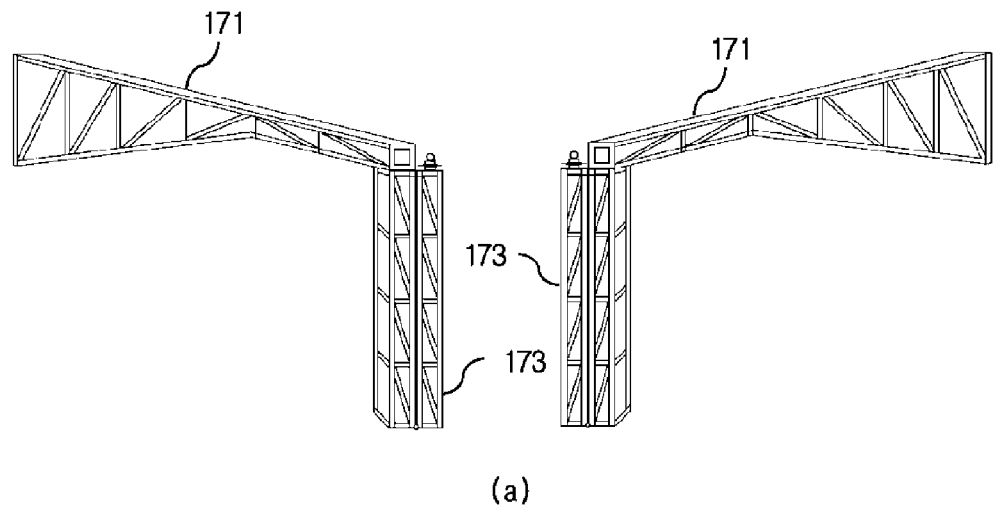
FIG. 5 is a view illustrating a folding process of a vertical support of a flying speaker.
Figure 5:
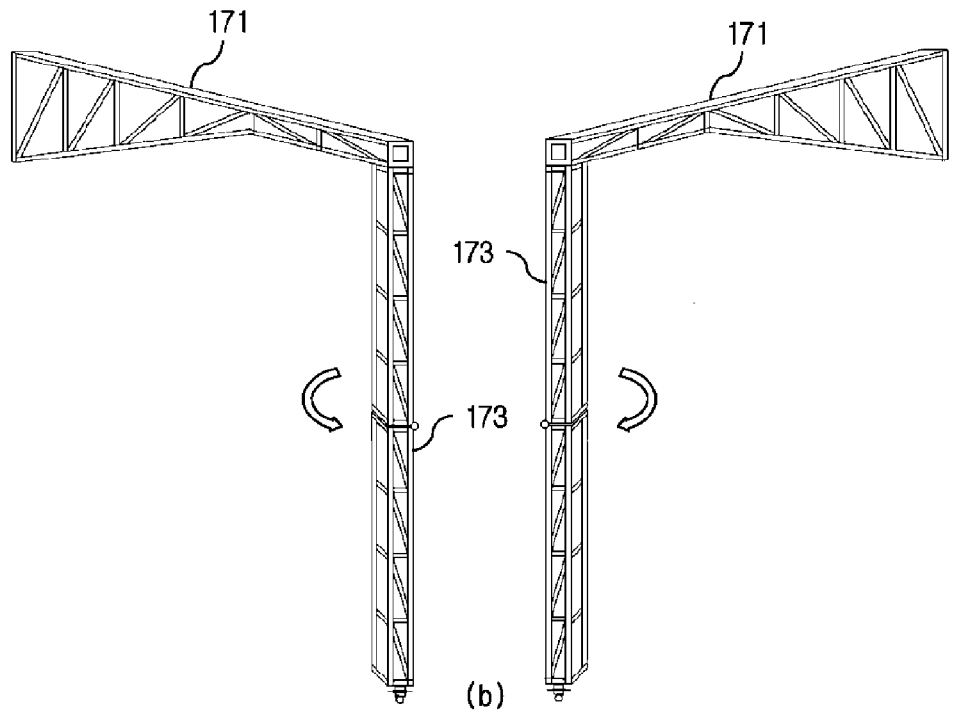

FIG. 5 shows a folding process of the flying speaker folding-type vertical support 173.

When the roof 110 is lifted from the state as shown in FIG. 2A, the flying speaker folding-type vertical support 173 may be lifted while being folded as shown in FIG. 5A.

Thereafter, the flying speaker supporting trusses 171 may be rotated to the left and right sides to select the location of the flying speakers 172, and then as shown in FIG. 5B, the flying speaker folding-type vertical support 173 may be spread.

The end of the flying speaker folding-type vertical support 173 may be supported on the floor surface or the top surface of the floor auxiliary panel 151.

The visual equipment supporting trusses 181 at the both sides of the top of FIG. 3B may have a structure that pivots about a rotation axis provided at left and right sides of the undersurface of the roof 110.

Figure 7:
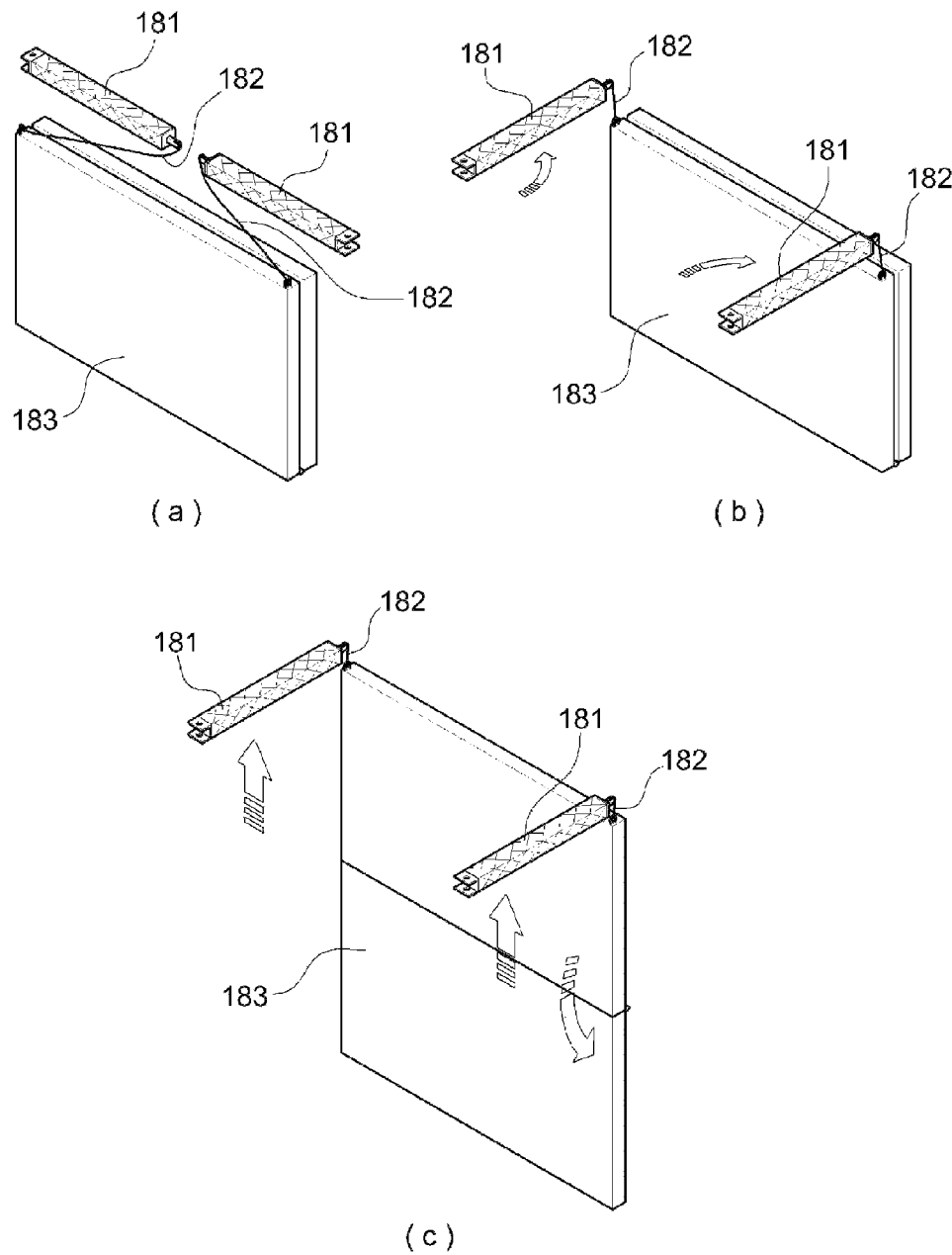
FIG. 7 is a view illustrating an installation process of visual equipment into a performance type.

FIG. 7 is a view illustrating an installation process of visual equipment into a performance type.

FIG. 7A shows a state in which the visual equipment is loaded in the freight vehicle carrying box 1 as shown in FIG. 3A, and FIG. 7C shows a state in which the visual equipment is installed into the performance state as shown in FIG. 2C.

The folding-type visual equipment 183 may be a visual apparatus that is folded in a vertical direction, and may comprise a combination of two large-size LCD panels.

Meanwhile, a visual equipment fixing cable 182 may be connected to upper ends of the both sides of the visual equipment supporting truss 181. The visual equipment fixing cable 182 may be provided so as to be adjustable in length.

The visual equipment fixing cable 182 may extend to the inside of the visual equipment supporting truss 181, and may be wound or unwound by a separate cable winding motor (not shown).

As shown in FIG. 7A, while the folding-type visual equipment 183 is folded in a vertical direction, the visual equipment supporting truss 181, as shown in FIG. 7B, may be spread at an angle of about 90 degree with respect to the folding-type visual equipment 183, and may be lifted to the end of the floor extension panel 150 and to a sufficient height.

During the above process, the installation of the folding-type visual equipment 183 can be completed as shown in FIG. 7C.

During such processes, the visual equipment fixing cable 182 may be sufficiently wound to adjust the height of the folding-type visual equipment 183.

Meanwhile, as shown in FIG. 3 C, after the folding-type visual equipment 183 and the flying speaker 172 are installed, the movable lighting trusses 161 may be spread from the inside to the outside.

The movable lighting trusses 161 may be disposed between the flying speaker supporting trusses 171 and between the visual equipment supporting trusses 181, respectively. The movable lighting trusses 161 may have a length longer than the flying speaker supporting trusses 171 and the visual equipment supporting trusses 181.

The flying speaker supporting trusses 171 may move the flying speakers 172 to predetermined locations at left and right sides over the stage.

Since the visual equipment supporting truss 181 has the same structure as the flying speaker supporting truss 171, and fixes the folding-type visual equipment 183 to an upper end of the rearmost side of the stage, the visual equipment supporting truss 181 may move and pull the cable winding motor to a location similar to the width of the floor extension panel 150.

However, the movable lighting truss 161 needs to have a relatively long length to maximize an effect of controlling the irradiation direction and angle while rotating during the performance.

The movable lighting truss 161 may have a length slightly shorter than the length of the longitudinal direction of the roof 110, and as shown in FIG. 3C, may be disposed so as to cross each other one by one at left and right sides.

As shown in FIG. 3C, the visual equipment supporting trusses 181 and the flying speaker supporting trusses 171 may have the same structure that is mutually symmetrical based on the central line of the longitudinal direction of the roof 110.

Also, the movable lighting trusses 161 may have the same structure that is mutually symmetrical based on the central line of the longitudinal direction of the roof 110, but as shown in FIG. 3C, may be turned or adjustable in length, by a hinge or a connection pin that is pivoted when used as a rear surface of the stage.

The roof extension panel 140 and the floor extension panel 150 may have a symmetrical structure, and when the flying speakers 172 and the folding-type visual equipment 183 fixed to the end of the visual equipment supporting truss 181 and the flying speaker supporting truss 171 are mutually replaceable, coupled and fixed, the direction of the stage can be simply changed.

The front and rear of the stage may be switched according to the situation that the vehicle is difficult to turn. In this case, the direction of the stage may be simply changed only by replacing the flying speaker 172 with the folding-type visual equipment 183.

Figure 6:
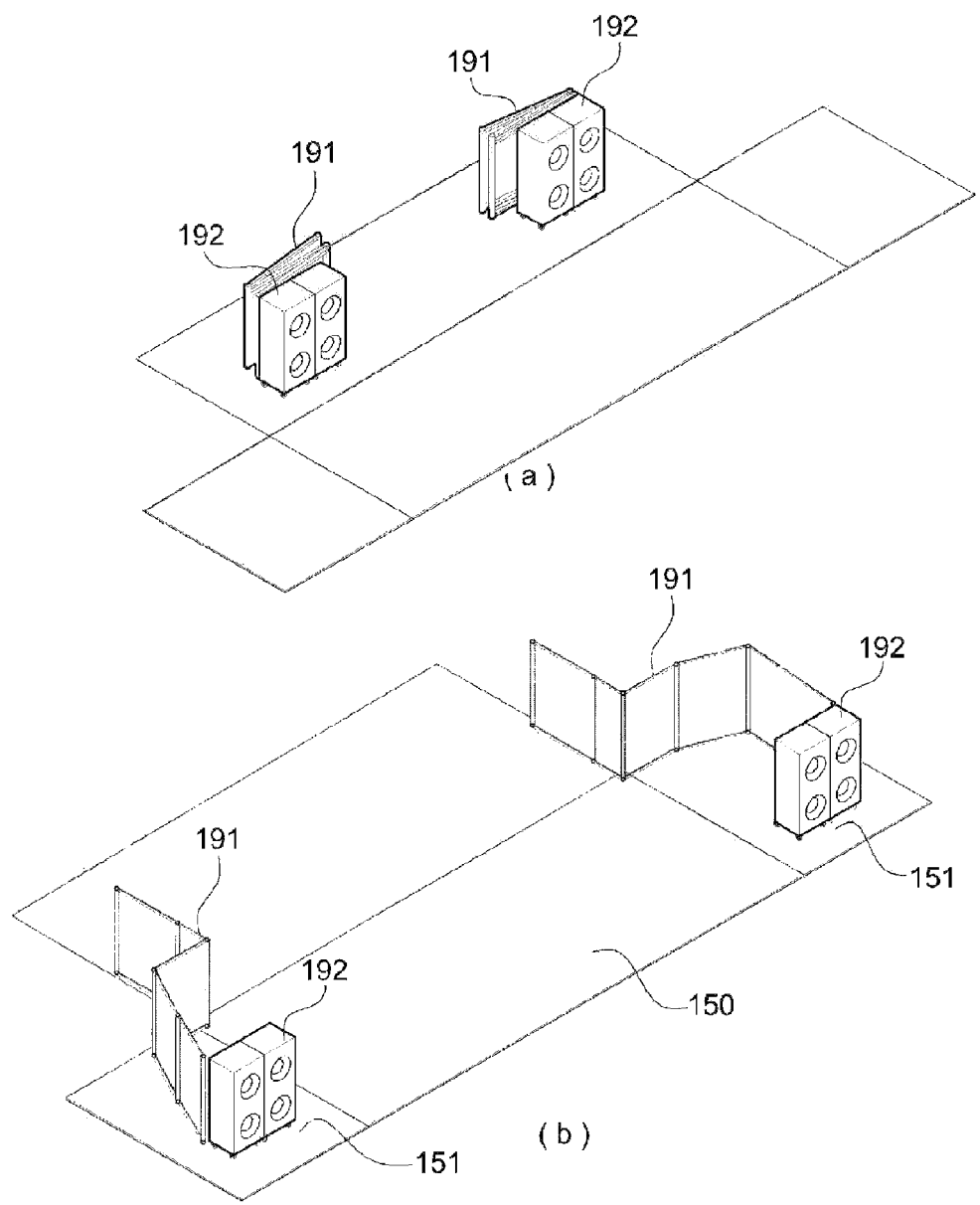
FIG. 6 is a view illustrating an installation process of a woofer speaker into a performance type.

FIG. 6 is a view illustrating an installation process of a woofer speaker into the performance type.

The folding-type pivoting guide 191 may have two or more axes that are disposed in an orthogonal direction to the floor 120, and may have hinge structures pivoting on the axes.

That is, the folding-type pivoting guide 191 may have a structure that is spread or folded based on a specific location of the floor 120.

The woofer speaker 192 may be fixed to the end of the folding-type pivoting guide 191, and may include wheels on the undersurface thereof to move.

FIG. 6A corresponds to FIG. 3A, which shows that the folding-type guide 191 and the woofer speaker 192 are loaded in the freight vehicle carrying box 1 while being folded.

FIG. 6B corresponds to FIG. 2C, which shows that the folding-type pivoting guide 191 is completely spread.

As described in FIG. 6B, the roof extension panel 140 and the floor extension panel 150 may be spread, and then the folding-type floor auxiliary panels 151 may be spread to the both sides of the floor extension panel 150. Thereafter, a pair of folding-type pivoting guides 191 may be spread, and a set of woofer speakers 192 may be moved onto certain locations of the folding-type floor auxiliary panel 151, thereby completing the installation of the stage into the performance state.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A vehicle for performances, comprising:
    a roof forming an upper surface of a freight vehicle carrying box;
    a floor forming a bottom surface of the freight vehicle carrying box;
    a roof lifting member vertically disposed at front and rear sides of the floor and adapted to lift up and down the roof;
    a pair of floor extension panels movably coupled to the front and rear sides of the floor;
    a pair of roof extension panels movably coupled to front and rear sides of the roof;
    a pair of visual equipment supporting trusses pivoting on rotation axes disposed at left and right sides of the roof, the pair of visual equipment supporting trusses being disposed under the roof and configured to allow a folding-type visual equipment to be fixed thereto;
    a pair of flying speaker supporting trusses pivoting on rotation axes disposed at the left and right sides of the roof, the pair of flying speaker supporting trusses being disposed under the roof and allowing a pair of flying speakers to be fixed thereto; and
    two or more movable lighting trusses disposed between the pair of visual equipment supporting trusses and the pair of flying speaker supporting trusses under the roof,
    wherein:
    each of the pair of visual equipment supporting trusses and the pair of flying speaker supporting trusses is arranged symmetrically with respect to a central line of the roof;
    the two or more movable lighting trusses are arranged symmetrically with respect to the central line of the roof; and
    each of the pair of visual equipment supporting trusses and the pair of flying speaker supporting trusses is configured to support both the folding-type visual equipment and the pair of flying speakers, to thereby allow a direction of a stage to be changed.

2. A vehicle as recited in claim 1, further comprising
    a folding-type visual equipment fixed to the pair of visual equipment supporting trusses; and
    a visual equipment fixing cable configured to connect the folding-type visual equipment to the pair of visual equipment supporting trusses.

3. A vehicle as recited in claim 1, further comprising:
    a pair of folding-type auxiliary panels movably coupled to the pair of floor extension panels;
    a pair of folding-type pivoting guides having two or more axes orthogonal to the floor and comprising hinge structures configured to pivot on the axes; and
    a set of woofer speakers fixed to the pair of folding-type pivoting guides and comprising wheels.

4. A vehicle as recited in claim 1, further comprising:
    the movable lighting trusses pivoting on rotation axes disposed at the left and right sides of the roof, the movable lighting trusses being disposed under the roof.

* * * * *